(12) United States Patent
Cakir et al.

(10) Patent No.: US 12,357,425 B2
(45) Date of Patent: Jul. 15, 2025

(54) DENTAL ROOT CANAL INSTRUMENT

(71) Applicant: Gebr. Brasseler GmbH & Co KG, Lemgo (DE)

(72) Inventors: Ömer Cakir, Lemgo (DE); Ernst Abrams, Lemgo (DE)

(73) Assignee: GEBR. BRASSELER GMBH & CO. KG, Lemgo (DE)

( * ) Notice: Subject to any disclaimer, the term of this patent is extended or adjusted under 35 U.S.C. 154(b) by 591 days.

(21) Appl. No.: 16/742,284

(22) Filed: Jan. 14, 2020

(65) Prior Publication Data
US 2020/0229899 A1 Jul. 23, 2020

(30) Foreign Application Priority Data

Jan. 17, 2019 (DE) .................... 10 2019 101 174.4

(51) Int. Cl.
*A61C 5/42* (2017.01)
(52) U.S. Cl.
CPC ..................... *A61C 5/42* (2017.02)
(58) Field of Classification Search
CPC ........................................................ A61C 5/42
See application file for complete search history.

(56) References Cited

U.S. PATENT DOCUMENTS

| 4,332,561 | A | * | 6/1982 | McSpadden | ............. | A61C 5/42 433/102 |
| 4,538,989 | A | * | 9/1985 | Apairo, Jr. | ................ | A61C 5/42 433/102 |
| 4,738,616 | A | * | 4/1988 | Reynaud | ................... | A61C 3/02 433/220 |
| 4,934,934 | A | * | 6/1990 | Arpaio, Jr. | ............... | A61C 5/42 433/102 |
| 5,106,298 | A | * | 4/1992 | Heath | ....................... | A61C 5/42 433/102 |
| 5,653,590 | A | * | 8/1997 | Heath | ....................... | A61C 5/42 433/102 |
| 5,713,736 | A | * | 2/1998 | Heath | ....................... | A61C 5/42 408/230 |

(Continued)

FOREIGN PATENT DOCUMENTS

| DE | 202012012526 U1 | 3/2013 | |
| DE | 102012012986 A1 * | 1/2014 | ............. B65D 83/08 |

(Continued)

OTHER PUBLICATIONS

German Office Action dated Jan. 11, 2020 for counterpart German Patent Application No. 10 2019 101 174.4.

(Continued)

*Primary Examiner* — Nicholas D Lucchesi
*Assistant Examiner* — Hao D Mai
(74) *Attorney, Agent, or Firm* — SHUTTLEWORTH & INGERSOLL, PLC; Timothy J. Klima

(57) ABSTRACT

The invention relates to a dental root canal instrument including a shaft region and a cutting region having cutting edges and a core, wherein an envelope curve of the cutting edges of the cutting region conically expands from a tip towards the shaft region with a first slope at a first angle, and wherein the core of the cutting edge region increases towards the shaft region with a second slope at a second angle, the second angle being smaller than the first angle.

9 Claims, 7 Drawing Sheets

(56) References Cited

U.S. PATENT DOCUMENTS

| | | | | |
|---|---|---|---|---|
| 5,857,852 A * | 1/1999 | Garman | .................... | A61C 5/42 433/102 |
| 5,882,198 A * | 3/1999 | Taylor | ...................... | A61C 5/42 433/102 |
| 6,206,695 B1 * | 3/2001 | Wong | ...................... | A61C 5/40 433/102 |
| 6,293,794 B1 * | 9/2001 | McSpadden | ............ | A61C 5/42 433/102 |
| 6,299,445 B1 * | 10/2001 | Garman | ................ | B24B 19/022 433/102 |
| 6,409,506 B1 * | 6/2002 | Graybill | .................... | A61C 5/42 433/102 |
| 6,702,579 B1 * | 3/2004 | Hoppe | ...................... | A61C 5/42 433/102 |
| 6,712,611 B2 * | 3/2004 | Garman | ................. | B24B 19/04 433/102 |
| 7,270,541 B1 * | 9/2007 | Johnson | .................... | A61C 5/42 433/102 |
| 7,311,522 B2 * | 12/2007 | Graybill | .................... | B23H 5/06 433/102 |
| 7,766,657 B2 * | 8/2010 | Jaunberzins | ............. | A61C 5/42 433/102 |
| 7,785,174 B2 * | 8/2010 | Badoz | ...................... | A61C 5/40 451/48 |
| 7,955,078 B2 * | 6/2011 | Scianamblo | ............ | A61C 5/42 433/102 |
| 9,585,731 B2 | 3/2017 | Becker et al. | | |
| 2004/0043357 A1 * | 3/2004 | Garman | .................... | A61C 5/42 433/102 |
| 2004/0214135 A1 * | 10/2004 | Ruddle | .................... | A61C 5/40 433/102 |
| 2005/0214711 A1 * | 9/2005 | Buchanan | ................ | A61C 5/42 433/102 |
| 2005/0282108 A1 * | 12/2005 | Goodis | .................... | A61C 5/44 433/102 |
| 2006/0228667 A1 * | 10/2006 | Buchanan | ................ | A61C 5/40 433/102 |
| 2006/0228669 A1 * | 10/2006 | Scianamblo | ............ | A61C 3/02 433/102 |
| 2008/0057468 A1 | 3/2008 | Rosenblood et al. | | |
| 2014/0272802 A1 * | 9/2014 | Li | ........................... | A61C 5/50 264/16 |
| 2014/0356809 A1 * | 12/2014 | Malagnino | ............... | A61C 5/42 433/102 |
| 2019/0223982 A1 * | 7/2019 | Li | ........................... | A61C 5/50 |

FOREIGN PATENT DOCUMENTS

| | | |
|---|---|---|
| DE | 202019100258 U1 | 1/2019 |
| EP | 1354566 A3 | 12/2003 |
| WO | 9943469 A1 | 9/1999 |

OTHER PUBLICATIONS

European Search Report dated May 13, 2020 from counterpart European Patent Application No. 20152244.8.

Opposition to counterpart European Patent Application No. 20152244.8 dated Jul. 22, 2022.

Nonpatent Opposition documents filed with Opposition to counterpart European Patent Application No. 20152244.8.

Summons dated Mar. 6, 2023 filed in the Opposition to counterpart European Patent Application No. 20152244.8.

* cited by examiner

A-A

B-B

C-C

DENTAL ROOT CANAL INSTRUMENT

This application claims priority to German Patent Application DE102019101174.4 filed Jan. 17, 2019, the entirety of which is incorporated by reference herein.

The present invention relates to a dental root canal instrument for treating a root canal of a tooth.

Root canal instruments have been known in prior art, for example from DE 202012012526 U1. Root canal instruments are required to have some flexibility so as to be able to track the bends and windings of the root canal to allow performing appropriate root canal treatment. Especially molar teeth may have a relatively complicated root canal system where the root canal instrument has to track even small radii of the root canal. Therefore, sufficient flexibility of the root canal instrument must be ensured. Thus, starting from a tip of the root canal instrument, root canal instruments are comprises of a core, i.e. a solid material core, which continuously expands towards a shaft region of the root canal instrument in a conical manner. At the tip, the core of the root canal instrument has a very small cross-sectional diameter, which continuously expands. A slope of the core runs parallel to a slope of an outer envelope of the cutting edges of the cutting region over the entire length of the shaft region.

Thus, it is the object of the present invention to provide a dental root canal instrument which has improved flexibility and, in particular, allows tracking the heavy windings of a root canal of a tooth, and still exhibiting its simple structure and easy low-cost manufacturability.

This object will be accomplished by a dental root canal instrument having the characteristics as disclosed herein. Preferred further developments are the subject matter of the invention.

The dental root canal instrument according to the invention having the characteristics as disclosed herein has the advantage that the root canal instrument has excellent flexibility. Thus, when treating a root canal, the bends and windings of the root canal can excellently be tracked using the root canal instrument according to the invention. Thus, dead or infected pulp tissue may be removed from the root canal completely and with high safety. This means that substantial elimination of dead or infected pulp tissue present in the root canal will be achieved. Moreover, preparation of the root canal may be done so as to be conical, with the narrowest point being at the apical end point of the root canal. According to the invention, this will be achieved in that the root canal instrument has a shaft region and a cutting region comprising at least one cutting edge and one core. The core (solid material core) of the root canal instrument is the region in the interior of the root canal instrument around which cutting edges and chip receiving flutes of the root canal instrument are located. An envelope curve of the cutting edges extends in a conically expanding manner, starting from a tip in the direction of the shaft region and having a first constant slope at a first angle $\alpha$. Furthermore, the core of the cutting region has at least one core region, which has a second slope towards the shaft region of the root canal instrument, which is smaller than the first slope. Thus, the second slope of the core is smaller than the first slope of the envelope curve of the cutting edges, at least in a sub-region, preferably in the complete core region. Usually, root canal instruments have cores, which expand conically towards the shaft region, and having the same slope as the envelope of the cutting edges. Thus, the approach of the invention is completely different from prior art. In that the core expands towards the shaft region with low slope, it is achieved for the root canal instrument to have higher flexibility, in particular for that portion of the cutting region, which is located closer towards the shaft region.

Preferably, the core expands from the tip of the root canal instrument towards the shaft region with a constant second slope, which is smaller than the first slope of the envelope of the cutting edges of the cutting region. Thus, the slopes of the core and the envelope of the cutting edges do not change from the tip to the shaft region, but rather remain constant.

Preferably, the core increases from the tip towards the shaft region with a degressive second slope. Thus, the core has the shape of a paraboloid, with the slope of the core continuously decreasing towards the shaft region.

According to an alternative embodiment of the invention, the core increases towards the shaft region in a stepwise manner. One or more steps may be provided, wherein the slopes at the respective step regions are always smaller than the slope of the envelope curve of the cutting edges.

According to a preferred alternative embodiment of the invention, the core conically expands at a first conical region from the tip to a first point P1 spaced from the tip towards the shaft region, towards the shaft region with the second slope. From the first point P1 to the shaft region, a second conical region having a slope of a third angle $\gamma$ is provided, the third angle $\gamma$ being smaller than the second angle $\beta$. Thus, the core has two different slopes, from the tip towards the shaft region, allowing a degree of flexibility of the root canal instrument to be adjusted.

It is especially preferred for a transition present between the stepwise increasing regions of the core to be edge-less. This ensures continuous transition between the stepwise increasing regions of the core.

Preferably, the slope of the core from the tip to the shaft region decreases by at least 75%, preferably by at least 90%. For example, the slope of the core at the tip is 1° and at the transition to the shaft region 0.1°, so that the slope of the core is reduced by 90%.

An axial distance between the tip and the point P1, from, which the slope of the root canal instrument core is reduced, is preferably within a range of 10% to 30% of a total axial length L of the cutting region and particularly preferably is 20% of the total length L of the cutting region.

Preferably, the first angle $\alpha$ of the first slope of the cutting edge envelope is in a range of $0.1° \leq \alpha \leq 2°$ and especially in a range of $0.5° \leq \alpha \leq 1.1°$. Then the second angle $\beta$ of the second slope of the core is correspondingly smaller.

Preferably, the second conical region of the core has a second length and has an axial direction of the root canal instrument, which is equal to or greater than 50% of the total length of the cutting region.

Still preferably, the root canal instrument comprises a cutting region having exactly two cutting edges. Alternatively, exactly three or exactly four cutting edges are provided. The cutting edges having S-shaped cross-section are especially preferred.

Preferably, chip flutes are provided between the cutting edges of the root canal instrument cutting region, the flute depth of which increases continuously from the tip of the root canal instrument to the shaft region. This ensures optimum removal of material removed by the root canal instrument in the root canal.

Still preferably, the widths of the chip flutes between the cutting edges of the cutting region continuously increase from the tip to the shaft region.

In the following, preferred example embodiments will be described in detail while making reference to the accompanying drawing, wherein:

FIG. 1 is a schematic, partially cut-away view of a tooth with a dental root canal instrument according to a first example embodiment of the invention, FIG. 2 is a schematic lateral view of the root canal instrument of FIG. 1, FIG. 2a is a regional view along line A-A of FIG. 2, FIG. 2b is a regional view along line B-B of FIG. 2, FIG. 2c a regional view along line C-C of FIG. 2, FIG. 3 is a schematic regional view of the root canal instrument of FIG. 2, FIG. 4 is a schematic representation of the slopes of the envelope curve of the cutting edges and the soul of the root canal instrument of the first example embodiment, FIG. 5 is a schematic representation of the slopes of the envelope curve of the cutting edges and a core of a root canal instrument according to a second example of execution of the invention, FIG. 6 is a schematic representation of the slopes of the envelope of the cutting edges and a core of a root canal instrument according to a third example of the invention;

In the following, a dental root canal instrument 1 will be described in detail according to a first preferred embodiment of the invention, while making reference to FIGS. 1 to 4.

Figure 2:
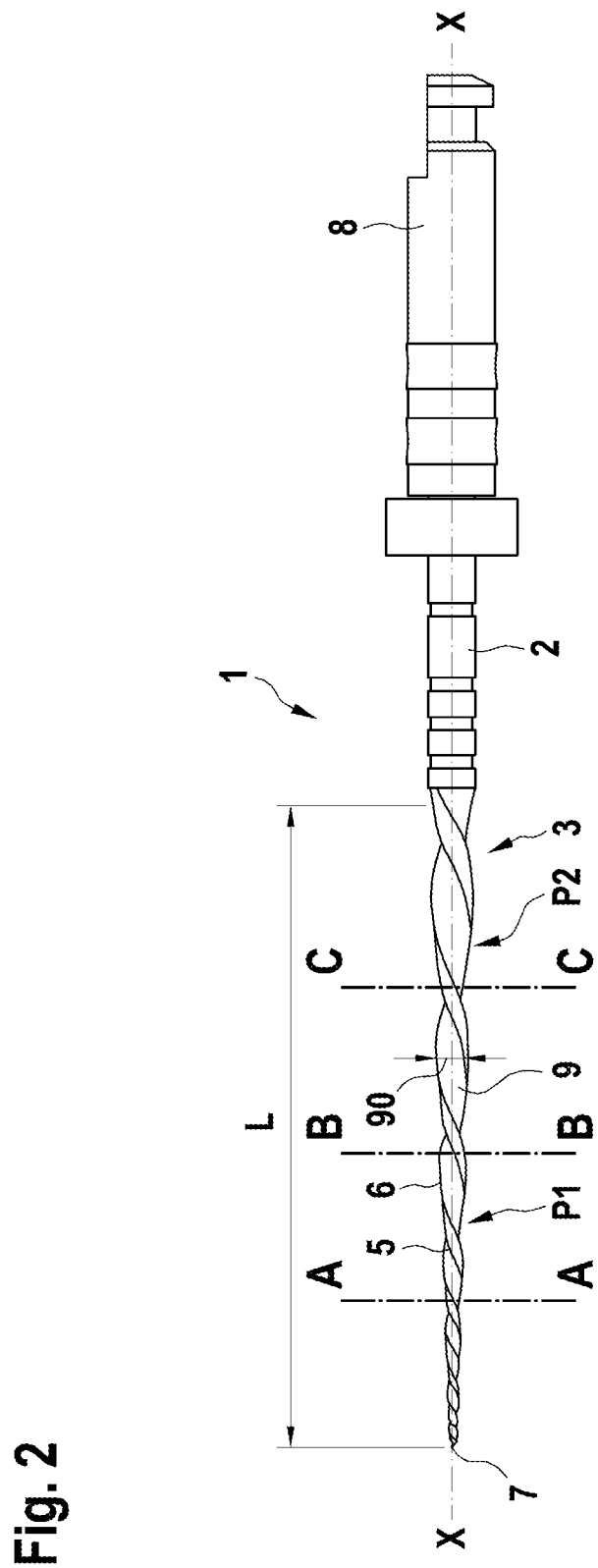

As can be seen from FIG. 2, the dental root canal instrument 1 comprises a shaft region 2, a cutting edge region 3 as well as a connecting piece 8 according to the first example embodiment. The connecting piece 8 is for connecting to a drive or a handpiece by which a dentist can operate the root canal instrument.

The cutting edge region 3 provided with cutting edges extends starting from a tip 7 of the root canal instrument to the shaft region 2.

Figure 7:
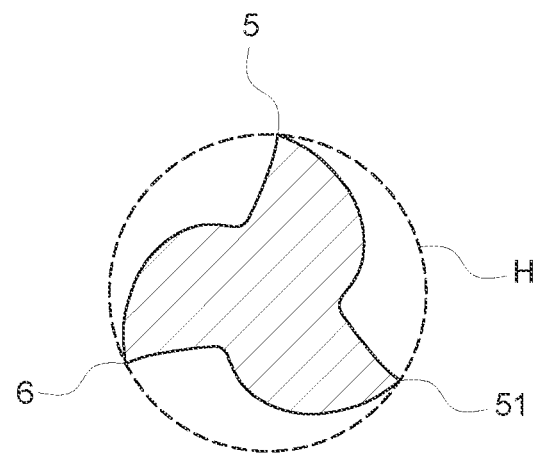
FIG. 7 is similar to FIG. 2C but shows three cutting edges.
Figure 8:
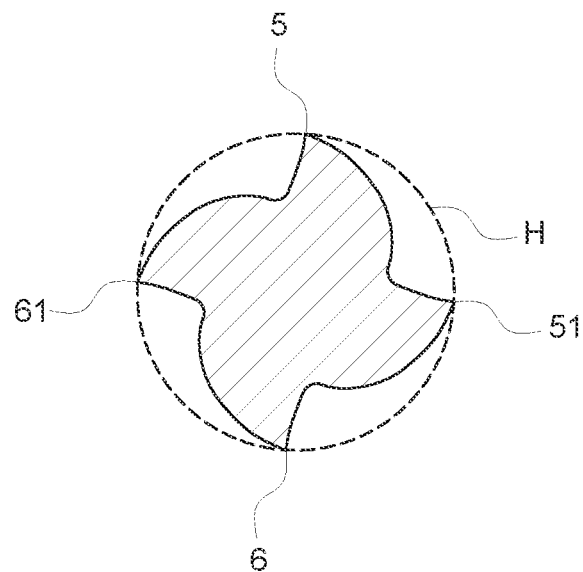
FIG. 8 is similar to FIG. 7 but shows four cutting edges.

The cutting edge region 3 has a total length L in the axial direction X-X of the root canal instrument. The cutting edge region 3 comprises exactly two cutting edges 5, 6, which are helically wound in the longitudinal direction of the root canal instrument. This results in chip flutes 9 between the two cutting edges 5, 6, which continuously expand both in width 90 and depth T, starting from the tip towards the shaft region 2. This ensures safe evacuation of removed material from the root canal. FIG. 7 shows an alternative cutting region having three cutting edges 5, 6 and 51. FIG. 8 shows a further alternative cutting region having cutting edges 5, 6, 51 and 61.

Figure 1:
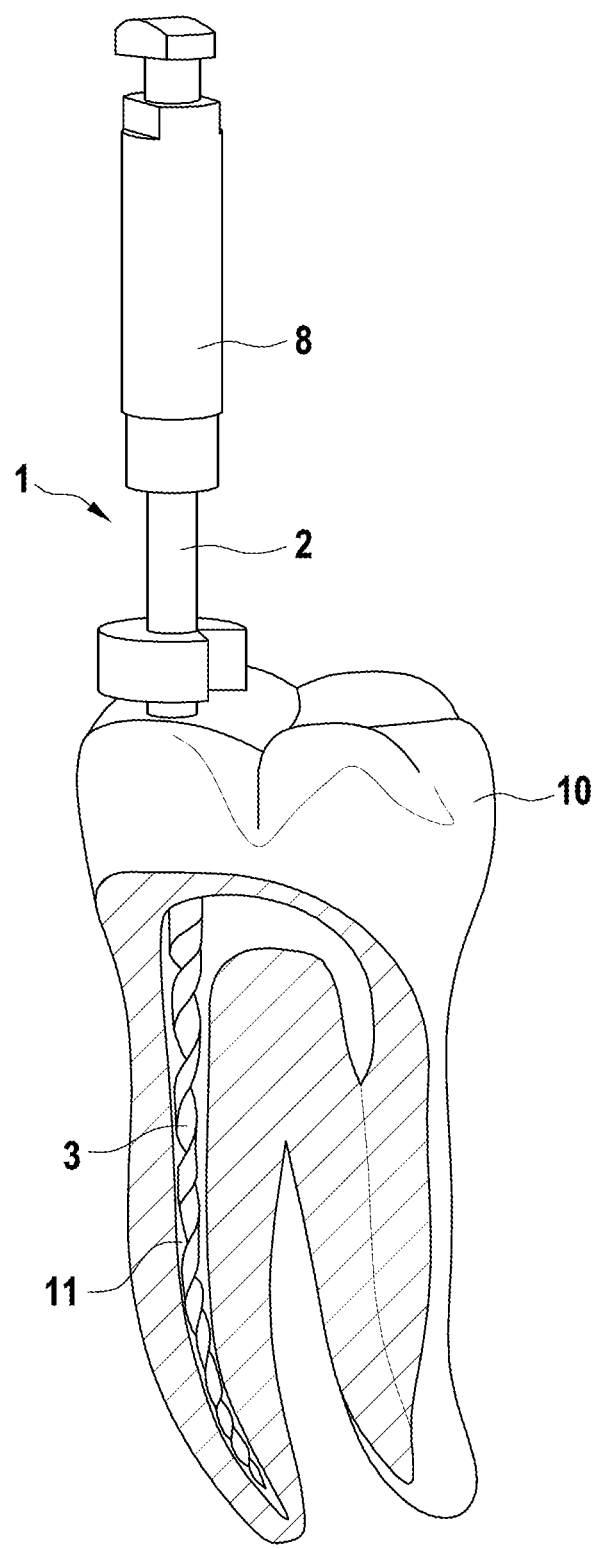

FIG. 1 schematically shows the use of the root canal instrument 1 in a tooth 10, which is shown as a cheek tooth. A root canal 11 of tooth 10 is bent. Since the root canals differ very much from each other, the root canal instrument 1 is required to be very flexible, as shown schematically in FIG. 1.

Moreover, the cutting edge region 3 has a core 4 (solid core), which is continuous from the tip 7 to the shaft region 2. The core 4 conically extends from the tip 7 of the root canal instrument to the shaft region 2. In addition, an envelope curve H of the two cutting edges 5, 6 conically expands from the tip of the root canal instrument to the shaft region 2.

Figure 4:
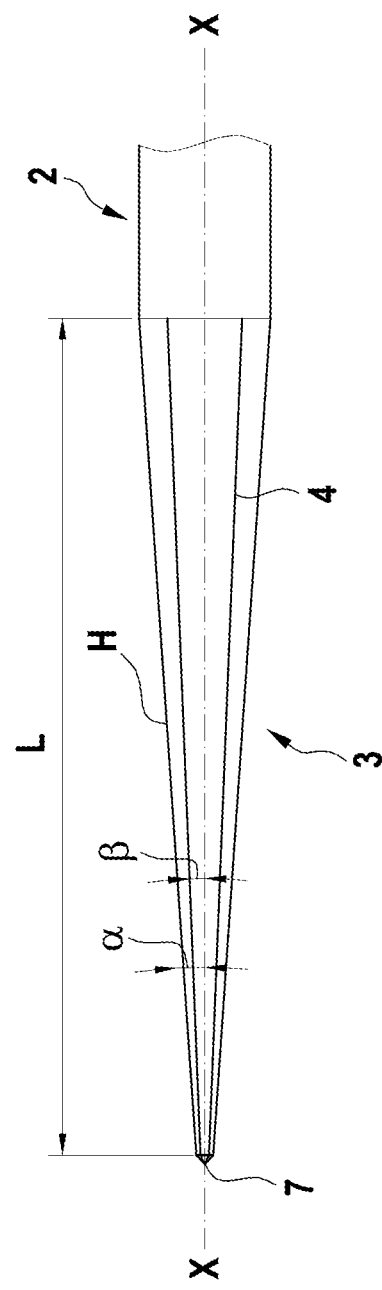

As shown in FIG. 4, however, the envelope H of the cutting edges expands with a first slope at a first angle $\alpha$, which is larger than a second slope at a second angle $\beta$ of the core 4. This is shown in detail in FIG. 4.

Consequently, contrary to prior art, the envelope curves H of the cutting edges and the core 4 no longer run parallel and having the same slope, but the slope of the core 4 is smaller than that of the envelope curve H of the cutting edges. This results in increase of flexibility, especially in the region of the cutting edge region 3, which is closer to the shaft region 2. As a result, the dental root canal instrument 1 is much more able to track excessive windings and bends of the root canal 11 of the tooth as compared to previously used prior art root canal instruments. Thus, flexibility of the root canal instrument in the shaft region 3 can significantly be increased as compared to prior art.

Figure 2A:
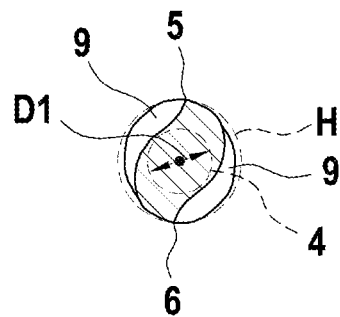
Figure 2B:
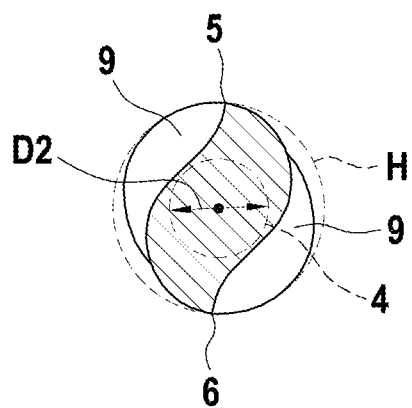
Figure 2C:
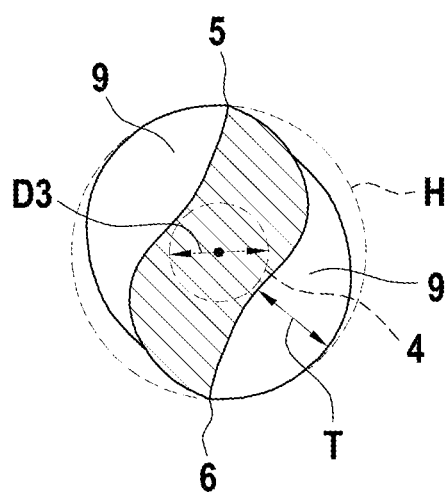
Figure 3:
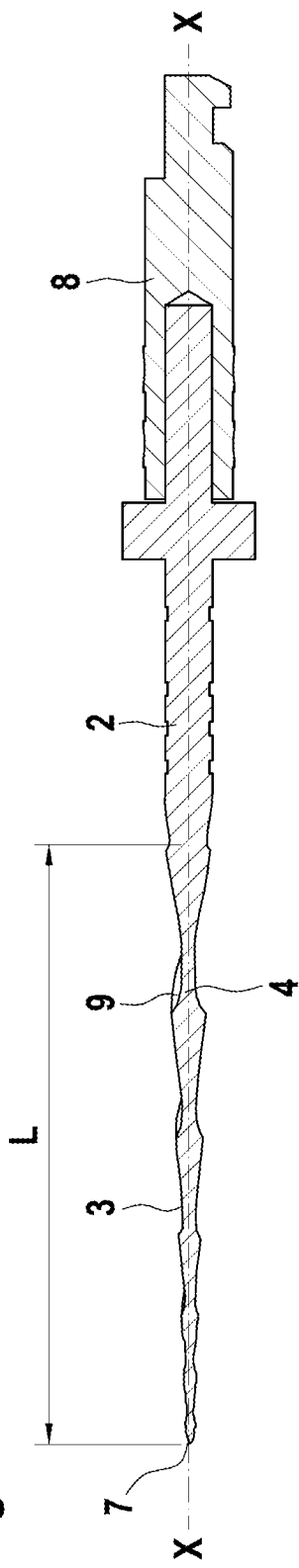

The cross-sections of the core 4 or the cutting edge region 3 are again schematically shown in FIGS. 2a to 2c. Herein, the core 4 has a first diameter D1 at cross-section A-A of FIG. 2a. Said first diameter D1 is smaller than a second diameter D2 at the intersection point B-B of FIG. 2b. The second diameter D2 is smaller than a third diameter D3 at the intersection point C-C of FIG. 2c. At the same time, a diameter of the outer envelope curve H of the cutting edges having the larger first slope increases significantly faster towards the shaft region 2 than the diameters of the core 4. Thus, the two cones of the core 4 and the envelope curve H of the cutting edges form two cylindrical cones having the same height, which, however, have different base areas at the transition to the shaft region 2, since the slopes of the two straight circular cones are different.

Figure 5:
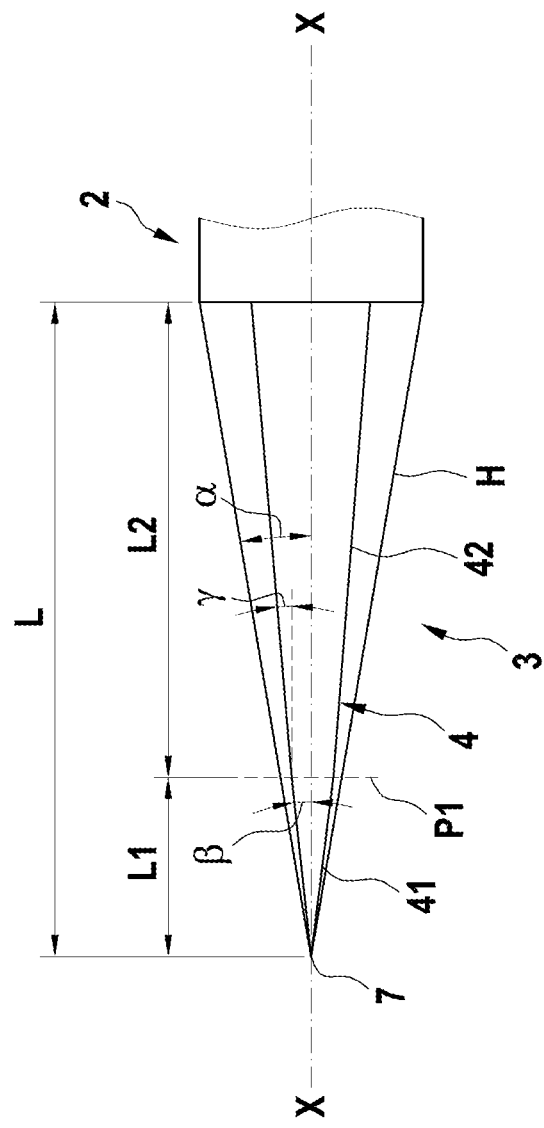

FIG. 5 schematically shows the design of a root canal instrument according to a second example embodiment of the present invention. Identical or operationally identical parts are identified using the same reference numbers.

The second example embodiment essentially corresponds to the first example embodiment, wherein, contrary to the first example embodiment, the core 4 of the second example embodiment is differently designed. As can be seen in FIG. 5, the core 4 comprises a first conical region 41, which starts at the tip 7 and extends to a first point P1.

The first conical region 41 is followed by a second conical region 42 of the core, which extends to shaft region 2. As shown in FIG. 5, a slope of the first and second conical regions 41, 42 is different. Herein, the second angle $\beta$ at the first conical region 41 is larger than a third angle $\gamma$ at the second conical region 42. The envelope curve H of the cutting edges 5, 6 conically and continuously extends from the tip 7 to the shaft region 2 at the first angle $\alpha$. Thus $\alpha > \beta > \gamma$.

By providing two different slopes at the core 4 having different angles $\beta$ and $\gamma$, the flexibility of the dental instrument 1 can be varied over the total length L. In the example embodiment shown in FIG. 5, the first conical region 41 extends over a length L1 in the axial direction X-X of the root canal instrument, and the second conical region 42 extends over a length L2. The length L2 is significantly greater than the length L1. Due to the slightly larger slope at the second angle $\beta$ at the first conical region 41, the dental instrument may be prevented from having a too small core with too small diameters in the tip region, which could result in risk of breaking of the dental instrument in this region. This can be avoided by selecting the slope having the second angle $\beta$. Thus, the core of the second example embodiment is composed of a truncated cone and a cone, preferably an edge-free transition between the cone and the truncated cone being provided. Alternatively, other truncated cones having different shell angles could be arranged. Otherwise, this example embodiment corresponds to the previous example embodiment, so that reference can be made to the description given therein.

Figure 6:
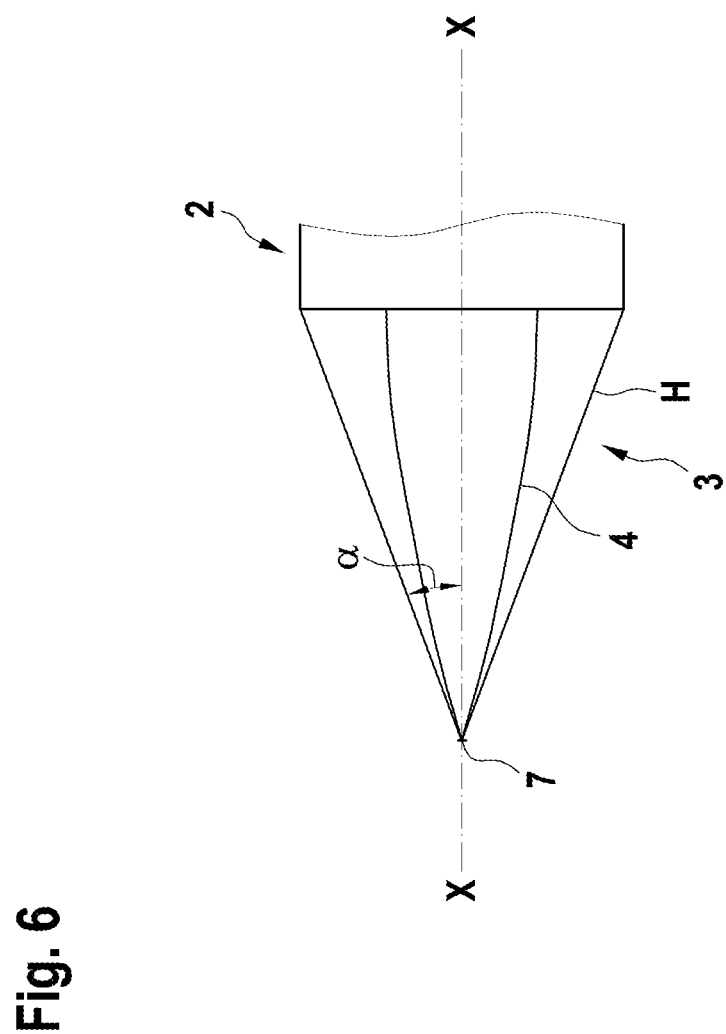

FIG. 6 shows a schematic view of a root canal instrument according to a third example embodiment of the present invention. Identical or operationally identical parts are again identified using the same reference numbers.

As can be seen in FIG. 6, in the third example embodiment, the core has the shape of a paraboloid. Herein, the envelope curve of the core 4 is defined by a parabola rotated around the central axis. Thus, the slope of core 4 continuously decreases from the tip 7 towards the shaft region 2, but still remains positive. It would also be possible for the paraboloid to change into a cylinder in the direction of the shaft region 2. In this way, a very flexible root canal instrument can be obtained. Otherwise, this example embodiment corresponds to the previous example embodiments, so that reference can be made to the description given therein.

LIST OF REFERENCE NUMBERS

1 Dental root canal instrument
2 Shaft region
3 Cutting region
4 Core
5, 6 Cutting
7 Point
8 Connecting piece
9 Chip flute
10 Tooth
11 Root canal
41 First conical region of the core
42 Second conical region of the core
90 Width of the flute
D1 First diameter of the core
D2 Second diameter of the core
D3 Third diameter of the core
H Envelope curve of the cutting edges
L Total length of the cutting region
L1 First conical region of the core
L2 Second conical region of the core
P1 First point
T Depth of flute
X-X Axial direction of the root canal instrument
α Angle of the slope of the envelope
β Angle of the slope of the core
γ Smaller angle of the slope of the core

The invention claimed is:

1. A dental root canal instrument comprising:
a shaft region having a longitudinal axis;
a cutting region having cutting edges and a core;
wherein an envelope curve of the cutting edges of the cutting region conically expands from a tip towards the shaft region with a first slope at a first angle with respect to the longitudinal axis;
wherein an outer diameter of the core of the cutting region increases from the tip towards the shaft region with a second slope, wherein the second slope has a first core region positioned toward the tip and a second core region positioned between the first core region and the shaft region, wherein the first core region is at a second angle with respect to the longitudinal axis, the second angle being smaller than the first angle; and
wherein the second core region is set at a third angle with respect to the longitudinal axis, the third angle being smaller than the second angle.

2. The root canal instrument according to claim 1, wherein the first core region is a first conical region and the second core region is a second conical region, the first conical region having the second angle, the second conical region having the third angle.

3. The root canal instrument according to claim 1, wherein a transition between the first core region and the second core region is continuous.

4. The root canal instrument according to claim 2, wherein the second slope decreases from the tip to the shaft region by at least 75%.

5. The root canal instrument according to claim 1, wherein the first angle is in a range of 0.1° to 2°, and/or wherein the second angle is less than 0.5°.

6. The root canal instrument according to claim 1, wherein the cutting region has exactly two cutting edges or exactly three cutting edges or exactly four cutting edges.

7. The root canal instrument according to claim 1, and further comprising chip flutes between the cutting edges, wherein a flute depth of the chip flutes continuously increases from the tip to the shaft region and/or wherein a width of the chip flutes continuously increases from the tip to the shaft region.

8. The root canal instrument according to claim 1, wherein the first angle is in a range of 0.5° to 1.1°, and/or wherein the second angle is less than 0.2°.

9. The root canal instrument according to claim 1, wherein the second slope decreases from the tip to the shaft region by at least 75%.

* * * * *